United States Patent
Westberg et al.

(10) Patent No.: US 11,658,866 B2
(45) Date of Patent: May 23, 2023

(54) REMOTELY CONFIGURING ETHERNET LAYER FUNCTIONALITY

(71) Applicant: Telefonaktiebolaget LM Ericsson (publ), Stockholm (SE)

(72) Inventors: Lars Westberg, Huddinge (SE); Hans Eriksson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 17/054,775

(22) PCT Filed: Jun. 1, 2018

(86) PCT No.: PCT/SE2018/050555
§ 371 (c)(1),
(2) Date: Nov. 12, 2020

(87) PCT Pub. No.: WO2019/231367
PCT Pub. Date: Dec. 5, 2019

(65) Prior Publication Data
US 2021/0218624 A1    Jul. 15, 2021

(51) Int. Cl.
*H04L 41/0806* (2022.01)
*H04L 12/46* (2006.01)
(Continued)

(52) U.S. Cl.
CPC ...... *H04L 41/0806* (2013.01); *H04L 12/4641* (2013.01); *H04L 45/74* (2013.01); *H04W 4/14* (2013.01)

(58) Field of Classification Search
None
See application file for complete search history.

(56) References Cited

U.S. PATENT DOCUMENTS

2008/0119198 A1    5/2008   Hettstedt et al.
2010/0296487 A1   11/2010   Karaoguz et al.
(Continued)

FOREIGN PATENT DOCUMENTS

| CN | 102724079 A | 10/2012 |
| WO | 2018008944 A1 | 1/2018 |
| WO | 2018008980 A1 | 1/2018 |

OTHER PUBLICATIONS

Examination Report, IN App. No. 202017037282, dated Sep. 21, 2021, 7 pages.
(Continued)

*Primary Examiner* — Christine T Duong
(74) *Attorney, Agent, or Firm* — Nicholson De Vos Webster & Elliott LLP

(57) ABSTRACT

A method and apparatus for remotely configuring Ethernet protocol functionality in a terminal device connected to a cellular communications network. One aspect provides a network node comprising a communications interface for communicating with the cellular communications network, a radio interface for communicating with a terminal device, and one or more processors. The network node is configured to receive, from the cellular communications network, a request to send an Ethernet configuration message to a terminal device connected to the cellular communications network, transmit the Ethernet configuration message to the terminal device and receive a response message from the terminal device.

19 Claims, 7 Drawing Sheets

(51) Int. Cl.
*H04L 45/74* (2022.01)
*H04W 4/14* (2009.01)

(56) References Cited

U.S. PATENT DOCUMENTS

| | | | |
|---|---|---|---|
| 2017/0303189 A1 | 10/2017 | Hampel et al. | |
| 2019/0021064 A1 | 1/2019 | Ryu et al. | |
| 2019/0109823 A1* | 4/2019 | Qiao | H04L 47/24 |
| 2019/0364541 A1 | 11/2019 | Ryu | |
| 2021/0168901 A1* | 6/2021 | Kim | H04W 8/08 |

OTHER PUBLICATIONS

International Preliminary Report on Patentability, PCT App. No. PCT/SE2018/050555, dated Dec. 10, 2020, 6 pages.
International Search Report and Written Opinion for International Application No. PCT/SE2018/050555, dated Mar. 22, 2019, 9 pages.
3GPP TS 23.501 V1.4.0, "3rd Generation Partnership Project; Technical Specification Group Services and System Aspects; System Architecture for the 5G System; Stage 2 (Release 15)," Sep. 2017, 151 pages, 3GPP Organizational Partners.
3GPP TS 23.502 V1.2.0, "3rd Generation Partnership Project; Technical Specification Group Services and System Aspects; Procedures for the 5G System; Stage 2 (Release 15)," Sep. 2017, 165 pages, 3GPP Organizational Partners.
3GPP TS 29.122 V0.2.0, "3rd Generation Partnership Project; Technical Specification Group Core Network and Terminals; T8 reference point for Northbound APIs (Release 15)," Sep. 2017, 78 pages, 3GPP Organizational Partners.
Husain et al., "Mobile Edge Computing with Network Resource Slicing for Internet-of-Things", 2018 IEEE 4th World Forum on Internet of Things (WF-IOT), IEEE, Feb. 5, 2018, pp. 1-6.
Supplementary European Search Report and Search Opinion, EP App. No. 18920819.2, dated Nov. 17, 2021, 11 pages.
Trivisonno et al., "Network Slicing for 5G Systems: A Review from an Architecture and Standardization Perspective", 2017 IEEE Conference on Standards for Communications and Networking (CSCN), IEEE, Sep. 18, 2017, pp. 36-41.
3GPP TS 23.501 V15.1.0, "3rd Generation Partnership Project; Technical Specification Group Services and System Aspects; System Architecture for the 5G System; Stage 2 (Release 15)," Mar. 2018, 200 pages, 3GPP Organizational Partners.

* cited by examiner

REMOTELY CONFIGURING ETHERNET LAYER FUNCTIONALITY

CROSS-REFERENCE TO RELATED APPLICATIONS

This application is a National stage of International Application No. PCT/SE2018/050555, filed Jun. 1, 2018, which is hereby incorporated by reference.

TECHNICAL FIELD

The present disclosure relates to a network node, to a terminal device, to a host computer and to a system, and to methods implemented in such apparatus for remotely configuring Ethernet layer functionality of a terminal device operating in a telecommunications network.

BACKGROUND

Recent years have seen an increase in the use of "cloud computing", whereby instead of using their own hardware and software resources, users instead lease computing resources in large data centres and access these resources over the Internet. Whilst cloud computing offers users increased flexibility and reduced costs, limitations can arise due to the physical distance between a user and a data centre, network congestion and transport protocols used. These limitations have given rise to interest in geographically dispersed data centres, which are sometimes referred to as "distributed clouds".

Computing networks such as enterprise networks and cloud computing networks (including distributed clouds) are often configured to be accessible by remote Internet-connected devices such as mobile telephones and laptop and tablet computers that are not physically connected to the computing network.

In fifth generation (5G) wireless systems a terminal device such as a User Equipment (UE) (e.g. a mobile telephone) is able to transmit Ethernet protocol data over a cellular telecommunications network. This offers advantages for communications between the terminal device and an enterprise or cloud computing network environment, since computing networks of this kind are commonly configured as Ethernet-based Local Area Networks (LANs). The ability of a terminal device to use Ethernet protocol for data transfer can simplify and speed up communications between the terminal device and a remote computing environment network such as an enterprise or cloud computing LAN.

However, permitting the transmission of Ethernet protocol data over a cellular telecommunications network also implies a requirement for the cellular telecommunications network to be able to handle Ethernet traffic. 3GPP standards define an identifier called PDP-type (Packet Data Protocol type), which is used in a Packet Data Protocol (PDP) layer of the cellular telecommunications network to identify a protocol type for data transmission. Ethernet is now one of the PDP types that can be specified, and Ethernet connectivity can be enabled on demand by invoking a "PDP context activation" service specifying the "Ethernet-PDP" type.

In order for a device to participate in a LAN computing environment it must have a Medium Access Control (MAC) address that is unique within the LAN computing environment. The MAC address is a unique identifier for the device. Devices such as desktop and laptop computers are typically configured with a MAC address during manufacture. In a typical enterprise LAN environment the MAC address of a device such as a desktop or laptop computer can be reconfigured, but direct access to the device is required to do this.

In order for a terminal device such as a mobile telephone to participate in a remote LAN (e.g. an enterprise LAN or a LAN of a cloud computing environment) that is connected to a cellular telecommunications network using the terminal device's capability to transmit and receive Ethernet data over the telecommunications network, the terminal device must have a MAC address. However, unlike devices such as desktop or laptop computers, terminal devices such as mobile telephones are typically not factory-configured with MAC addresses. Moreover, in a cellular telecommunications network environment there is no direct connection between the remote LAN and the terminal device that wishes to participate in the remote LAN. Thus, the remote LAN cannot directly configure the terminal device with a MAC address.

SUMMARY

According to a first aspect, the disclosure provides a network node comprising: a communications interface for communicating with a cellular communications network which implements a User Plane Function (UPF) and a Network Exposure Function (NEF); a radio interface for wirelessly communicating with a terminal device; and one or more processors. The network node is configured to: receive, from the NEF of the cellular communications network, a request to send an Ethernet configuration message to a terminal device connected to the cellular communications network; transmit the Ethernet configuration message to the terminal device, without using the UPF of the cellular communications network, using the radio interface; and receive a response message from the terminal device at the radio interface.

The request may include an identifier and a payload. The identifier identifies a receiving application on the terminal device, and the payload comprises information intended for the receiving application identified by the identifier.

The network node may be configured to transmit the Ethernet configuration message to the terminal device in a short messaging service (SMS) message.

The payload may comprise information for setting a medium access control (MAC) address of the terminal device.

Alternatively, the payload may comprise information for querying a medium access control (MAC) address of the terminal device.

Alternatively, the payload may comprise configuration information for a virtual local area network (VLAN).

Alternatively, the payload may comprise information for setting Ethernet quality of service parameters at the terminal device.

The request may be an application trigger request.

The application trigger request may be the Ethernet configuration message.

According to a second aspect of the present disclosure there is provided a terminal device configured to communicate with a cellular communications network which implements a User Plane Function (UPF) and a Network Exposure Function (NEF) to receive an Ethernet configuration message originating from the NEF of the cellular communications network. The terminal device comprises: a radio interface; one or more processors; and memory storing executable Ethernet configuration application code which, when executed by the one or more processors, causes the terminal device, in response to receiving the Ethernet configuration message from the cellular communications network at the radio interface, to perform an Ethernet configuration action and to transmit a response message to the cellular communications network using the radio interface without using the UPF of the cellular communications network.

The terminal device may be configured to receive the Ethernet configuration message in a short messaging service (SMS) message.

The terminal device may be configured to receive an application trigger request comprising the Ethernet configuration message.

The executable code, when executed by the one or more processors, may cause the terminal device, in response to receiving an Ethernet configuration message comprising information for setting a MAC address of the terminal device, to attempt to set its MAC address in accordance with the information and to transmit a response message to the cellular communications network indicating acceptance or rejection of the MAC address by the terminal device.

Alternatively, the executable code, when executed by the one or more processors, may cause the terminal device, in response to receiving an Ethernet configuration message comprising information for querying a MAC address of the terminal device, to retrieve its MAC address and to transmit a response message indicating the retrieved MAC address to the cellular communications network.

Alternatively, the executable code, when executed by the one or more processors, may cause the terminal device, in response to receiving an Ethernet configuration message comprising configuration information for a VLAN, to attempt to configure a VLAN in accordance with the retrieved information and to transmit a response message to the cellular communications network indicating acceptance or rejection of the virtual local area network (VLAN) configuration.

Alternatively, the executable code, when executed by the one or more processors, may cause the terminal device, in response to receiving an Ethernet configuration message comprising information for setting Ethernet quality of service parameters at the terminal device, attempt to configure Ethernet quality of service parameters in accordance with the received information and to transmit a response message to the cellular communications network indicating acceptance or rejection of the Ethernet quality of service parameters.

According to a third aspect of the present disclosure there is provided a host computer configured to communicate with a cellular communications network which implements a User Plane Function (UPF) and a Network Exposure Function (NEF). The host computer comprises: a communications interface; one or more processors; and memory storing executable Ethernet configuration application code which, when executed by the one or more processors, causes the host computer to generate a request to send an Ethernet configuration message to a terminal device connected wirelessly to the cellular communications network and to transmit the generated request to the NEF of the cellular communications network.

The request may include an identifier and a payload. The identifier identifies a receiving application on the terminal device. The payload comprises information intended for the receiving application identified by the identifier.

The payload may comprise information for setting a medium access control (MAC) address of the terminal device.

Alternatively, the payload may comprise information for querying a medium access control (MAC) address of the terminal device.

Alternatively, the payload may comprise configuration information for a virtual local area network (VLAN).

Alternatively, the payload may comprise information for setting Ethernet quality of service parameters at the terminal device.

The request may be an application trigger request.

The application trigger request may be the Ethernet configuration message.

According to a fourth aspect of the present disclosure there is provided a system, including a host computer, a cellular communications network which implements a User Plane Function (UPF) and a Network Exposure Function (NEF) and a terminal device, for remotely configuring Ethernet layer protocol functionality of the terminal device. The host computer is configured to generate a request to send an Ethernet configuration message to the terminal device and to transmit the generated request to the NEF of the cellular communications network; the cellular communications network is configured to receive the request to transmit the Ethernet configuration message to the terminal device without using the UPF of the cellular communications network; and the terminal device is configured to receive the Ethernet configuration message from the cellular communications network via a wireless connection between the terminal device and the cellular communications network, and, in response to receiving the Ethernet configuration message, to perform an Ethernet configuration action and to transmit a response message to the cellular communications network via the wireless connection.

The request may include an identifier and a payload. The identifier identifies a receiving application on the terminal device. The payload comprises information intended for the receiving application identified by the identifier.

The network node may be configured to transmit the Ethernet configuration message to the terminal device in a short messaging service (SMS) message.

The payload may comprise information for setting a medium access control (MAC) address of the terminal device. The terminal device may be configured to attempt to set its MAC address in accordance with the received information and to transmit a response message to the network node indicating acceptance or rejection of the MAC address by the terminal device in response to receiving the Ethernet configuration message.

Alternatively, the payload may comprise information for querying a medium access control (MAC) address of the terminal device. The terminal device may be configured to retrieve its MAC address and to transmit a response message indicating the retrieved MAC address to the network node in response to receiving the Ethernet configuration message.

Alternatively, the payload may comprise configuration information for a virtual local area network (VLAN). The terminal device may be configured to attempt to configure a VLAN in accordance with the received information and to transmit a response message to the network node indicating acceptance or rejection of the VLAN configuration in response to receiving the Ethernet configuration message.

Alternatively, the payload may comprise information for setting Ethernet quality of service parameters at the terminal device. The terminal device may be configured to attempt to configure Ethernet quality of service parameters in accordance with the received information and to transmit a response message to the network node indicating acceptance or rejection of the Ethernet quality of service parameters in response to receiving the Ethernet configuration message.

The request may be an application trigger request.

The application trigger request may be the Ethernet configuration message.

The host computer may be a controller of a cloud computing platform. The host computer may be configured to execute Ethernet configuration application code which generates the request.

According to a fifth aspect of the present disclosure there is provided a method, implemented in a network node, the method comprising: receiving, from a cellular communications network which implements a User Plane Function (UPF) and a Network Exposure Function (NEF), a request originating from the NEF to send an Ethernet configuration message to a terminal device wirelessly connected to the cellular communications network; transmitting the Ethernet configuration message to the terminal device without using the UPF of the cellular communications network; and receiving a response message from the terminal device.

The Ethernet configuration message may be transmitted to the terminal device in a short messaging service (SMS) message.

According to a sixth aspect of the present disclosure there is provided a method, implemented in a terminal device, the method comprising: receiving an Ethernet configuration message originating from a Network Exposure Function (NEF) of a cellular communications network which implements a User Plane Function (UPF) via a wireless connection between the terminal device and the cellular communications network; and in response to receiving the Ethernet configuration message from the cellular communications network, performing an Ethernet configuration action and transmitting a response message to the cellular communications network via the wireless connection without using the UPF.

The Ethernet configuration message may be received at the terminal device in a short messaging service (SMS) message.

According to a seventh aspect of the present disclosure there is provided a method, implemented in a host computer that communicates with a cellular communications network which implements a User Plane Function (UPF) and a Network Exposure Function (NEF), the method comprising: generating a request to send an Ethernet configuration message to a terminal device wirelessly connected to the cellular communications network; and transmitting the generated request to the NEF of the cellular communications network.

According to an eighth aspect of the present disclosure there is provided a method, implemented in a communication system including a host computer, a cellular communications network which implements a User Plane Function (UPF) and a Network Exposure Function (NEF), and a terminal device, for remotely configuring Ethernet layer protocol functionality of the terminal device, the method comprising: at the host computer, generating a request to send an Ethernet configuration message to the terminal device and transmitting the generated request to the NEF of the cellular communications network; at the cellular communications network, receiving the request and transmitting the Ethernet configuration message to the terminal device via a wireless connection between the cellular communications network and the terminal device without using the UPF of the cellular communications network; and at the terminal device, receiving the Ethernet configuration message and, in response to receiving the Ethernet configuration message, performing an Ethernet configuration action and transmitting a response message to the cellular communications network via the wireless connection without using the UPF of the cellular communications network.

The request may include an identifier and a payload. The identifier identifies a receiving application on the terminal device. The payload comprises information intended for the receiving application identified by the identifier.

The Ethernet configuration message may be transmitted to the terminal device in a short messaging service (SMS) message.

The payload may comprise information for setting a medium access control (MAC) address of the terminal device. In response to receiving the Ethernet configuration message, the terminal device may attempt to set its MAC address in accordance with the received information and transmit a response message to the cellular communications network indicating acceptance or rejection of the MAC address by the terminal device.

Alternatively, the payload may comprise information for querying a medium access control (MAC) address of the terminal device. In response to receiving the Ethernet configuration message, the terminal device may retrieve its MAC address and transmit a response message indicating the retrieved MAC address to the cellular communications network.

Alternatively, the payload may comprise configuration information for a virtual local area network (VLAN). In response to receiving the Ethernet configuration message, the terminal device may attempt to configure a VLAN in accordance with the received information and transmit a response message to the cellular communications network indicating acceptance or rejection of the VLAN configuration.

Alternatively, the payload may comprise information for setting Ethernet quality of service parameters at the terminal device. In response to receiving the Ethernet configuration message, the terminal device may attempt to configure Ethernet quality of service parameters in accordance with the received information and transmit a response message to the cellular communications network indicating acceptance or rejection of the Ethernet quality of service parameters.

The request may be an application trigger request.

The application trigger request may be the Ethernet configuration message.

The host computer may be a controller of a cloud computing platform. The host computer may be configured to execute Ethernet configuration application code which generates the request.

BRIEF DESCRIPTION OF THE DRAWINGS

Embodiments of the disclosure will now be described, strictly by way of example only, with reference to the accompanying drawings, of which.

DETAILED DESCRIPTION

Figure 1:
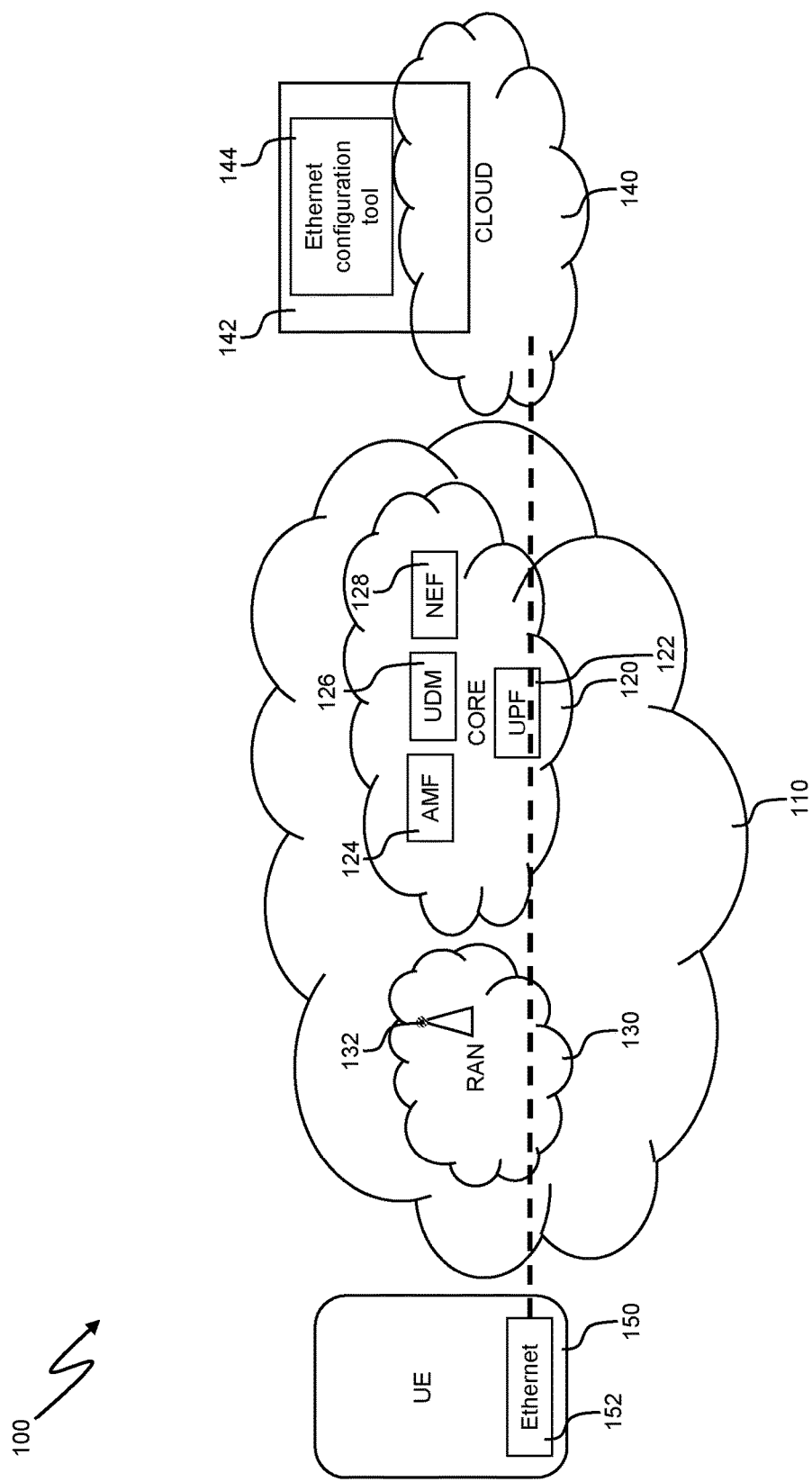
FIG. 1 is a schematic representation of a communication system.

Referring first to FIG. 1, a communication system is shown generally at 100. The communication system includes a cellular telecommunications network 110 such as a 3GPP-type cellular network, a computing network 140 such as an enterprise network or a distributed or cloud computing network, and a terminal device 150. The telecommunications network 110 is operative to connect to the terminal device 150 and to the computing network 140 to enable bidirectional transfer of Ethernet protocol data between the computing network 140 and the terminal device 150.

The telecommunications network 110 comprises a core network 120, which may be a 5G core network, for example, and an access network 130, which may be, for example, a radio access network (RAN).

The core network 120 implements a User Plane Function (UPF) 122 that is configured to permit transport of Ethernet data frames between the core network 120 and the computing network 140. The core network 120 also implements an Access and Mobility Management Function (AMF) 124, a Unified Data Management Function (UDM) 126 and a Network Exposure Function (NEF) 128, which are used in the process of remotely configuring Ethernet layer protocol functionality in the terminal device 150, as will be described in more detail below.

The access network 130 includes one or more base stations 132, which may be, for example, one or more NodeBs (NBs), eNodeBs (eNBs) gNodeBs (gNBs) or wireless access points of other types. The or each base station 132 is connectable to the core network 120 via a wired or wireless connection. The terminal device 150 is configured to connect to or be paged by the base station 132, when in a coverage area of a base station 132.

The computing network 140 includes a host computer 142, which may be, for example, a Software Defined Network (SDN) controller if the computing network comprises a software defined network, or may alternatively be some other network controller or server of the computing network 140. The host computer 142 executes an Ethernet configuration application, module or tool 144 for remotely configuring Ethernet layer protocol functionality in the terminal device 150, as will be described in more detail below. The host computer 142 may also configure internal data transport within the computing network 140.

In the example illustrated in FIG. 1 the terminal device 150 is shown as a single unitary user equipment (UE). However, it will be appreciated that the terminal device may instead comprise a split terminal arrangement. Such an arrangement may include a terminal equipment such as modem device (for example a WiFi access point) which includes Ethernet switching capabilities and is able to connect to the core network 120 (e.g. via the access network 130) and a mobile terminal such as a mobile telephone or the like that connects to the modem device to permit Ethernet protocol data connectivity between the user device and the computing network 140.

The terminal device 150 implements Ethernet protocol layer functionality 152 and is able, once configured with a MAC address, to transmit and receive Ethernet data frames to and from the computing network 140 over the core network 120.

Example implementations of the host computer 142, terminal device 150 and a network node which may be a network node of either the core network 120 or a network node of the access network 130 will now be described with reference to FIG. 2, which is a schematic illustration of a host computer 210 in communication with a terminal device 240 via a network node 270 over a partially wireless connection.

In a communication system 200, a host computer 210 (which may represent the host computer 142 of the system 100 of FIG. 1) comprises hardware 220 including a communications interface 222 configured to establish and maintain a wired or wireless connection with a telecommunications network such as the telecommunications network 110 of FIG. 1. The hardware 220 of the host computer 210 further includes one or more processors 224 which may comprise, for example, one or more programmable processors, application specific integrated circuits (ASICs), field programmable gate arrays (FPGAs) or combinations of such processors configured or adapted to execute instructions. The hardware 220 of the host computer 210 further includes memory 226 coupled to or integrated with the one or more processors 224 and operative to store executable instructions and data.

The host computer 210 includes software 230 which may be stored, for example, in memory 226. The software 230 includes an Ethernet configuration application, module or tool 232 which, when executed by the one or more processors 224 of the host computer 210, is operative to generate a remote Ethernet configuration message for transmission to the terminal device 240, via the telecommunications network 110 (as illustrated by arrow 205), in order to perform remote configuration of Ethernet protocol functionality of the terminal device 240. In alternative embodiments, the Ethernet configuration application, module or tool 232 may be embodied entirely within hardware. In further alternative embodiments, the Ethernet configuration application, module or tool 232 may be embodied partly within hardware and partly within software.

The terminal device 240 comprises hardware 250 including a radio interface 252 configured to establish and maintain a wireless connection with a telecommunications network such as the telecommunications network 110 of FIG. 1, for example a wireless connection with a base station 132 of the access network 130 of the telecommunications network 110 of FIG. 1, or a wireless connection with some other network node of the telecommunications network 110. The hardware 250 of the terminal device 240 further includes one or more processors 254 which may comprise, for example, one or more programmable processors, application specific integrated circuits (ASICs), field programmable gate arrays (FPGAs) or combinations of such processors configured or adapted to execute instructions. The hardware 250 of the terminal device 240 further includes memory 256 coupled to or integrated with the one or more processors 254 and operative to store executable instructions and data.

The terminal device 240 includes software 260 which may be stored, for example, in memory 256. The software 260 includes an Ethernet configuration application, module or tool 262 which, when executed by the one or more processors 254 of the terminal device 240, is operative to receive a remote Ethernet configuration message originating from the host computer 210, to perform one or more Ethernet layer protocol configuration actions in response to the received Ethernet configuration message, and to generate a response to the received Ethernet configuration message to be transmitted to the host computer 210 via the telecommunications network 110, as illustrated by arrow 215. In alternative embodiments, the Ethernet configuration application, module or tool 262 may be embodied entirely within hardware. In further alternative embodiments, the Ethernet configuration application, module or tool 262 may be embodied partly within hardware and partly within software.

Figure 2:
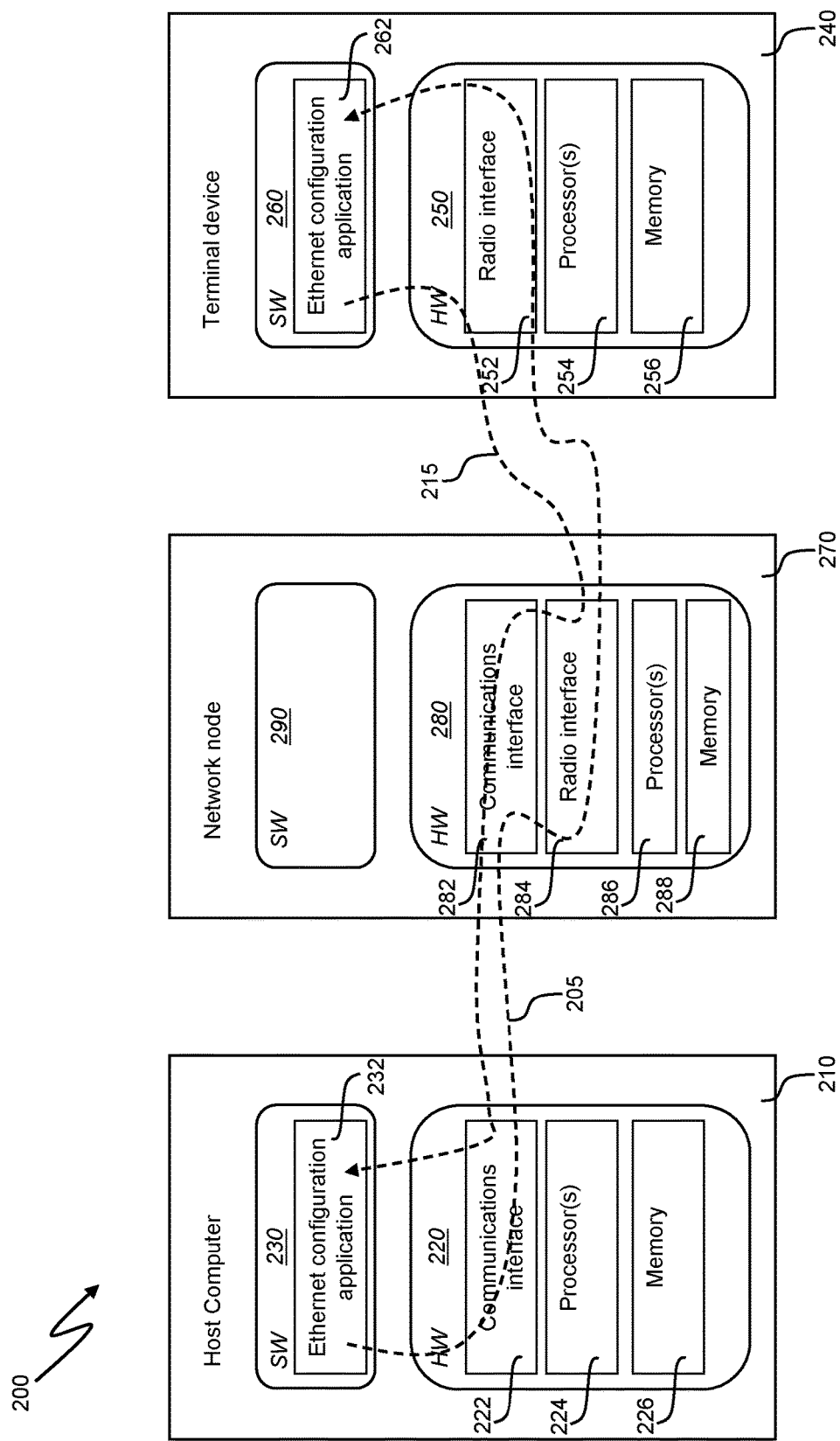
FIG. 2 is a schematic illustration of a host computer in communication with a terminal device, via a network node, over a partially wireless connection.

FIG. 2 also shows a network node 270, which may be a network node of the telecommunications network 110 of FIG. 1. For example, the network node 270 may be a network node such as a base station 132 of the access network 130, or alternatively may be a network node of the core network 120.

The network node 270 comprises hardware 280 including communications interface 292 configured to establish and maintain a wired or wireless connection with the host computer 210. This wired or wireless connection may be established directly with the host computer 210, or may be established by means of an intermediate device such as an intermediate network node of the telecommunications network 110, for example.

The hardware 280 of the network node 270 further includes a radio interface 284 configured to establish and maintain a wireless connection with the terminal device 240. The hardware 280 of the network node 270 further includes one or more processors 286 which may comprise, for example, one or more programmable processors, application specific integrated circuits (ASICs), field programmable gate arrays (FPGAs) or combinations of such processors configured or adapted to execute instructions. The hardware 280 of the network node 270 further includes memory 288 coupled to or integrated with the one or more processors 286 and operative to store executable instructions and data. The network node 270 further includes software 290 which may be stored, for example, in memory 288.

A method performed by the system 100 of FIG. 1 for remote configuration of Ethernet protocol layer functionality of the terminal device 150 prior to the establishment of user plane connectivity between the terminal device 150 and the telecommunications network 110 or the host computer 142 will now be described by reference to the flow chart of FIG. 3, in which the method is shown generally at 300, and the signalling diagram of FIG. 4. The method described below permits rapid configuration of Ethernet layer functionality of the terminal device 150 using only straightforward out of band signalling techniques, without requiring any user plane connectivity between the terminal device 150 and the telecommunications network 110 or the host computer 142 for Ethernet protocol configuration purposes.

In a first step 310 of the method 300, the host computer 142 executes the Ethernet configuration application, module or tool 144 to generate a request to send an Ethernet configuration message to the terminal device.

In order to generate the request to send an Ethernet configuration message, the Ethernet configuration application, module or tool 144 executing on the host computer 142 may invoke an Application Triggering service of the NEF 128. By invoking this service the host computer 142 requests the telecommunications network 110 (specifically the NEF 128) to send an application trigger to the terminal device 150. In order to invoke this service the Ethernet configuration application, module or tool 144 first generates an Application Trigger request message including the parameters that are required for valid application trigger request using the service, as follows:

GPSI (Generic Public Subscription Identifier): An identifier that is used between the Ethernet configuration application, module or tool 144 executing on the host computer 142 and the telecommunications network 110 as an identifier for the terminal device 150. This identifier could be an IMSI (International Mobile Subscriber Identify) of the terminal device, but it could also be a different ID so as to avoid revealing a mobile phone number associated with the terminal device 150.

Requester Identifier: an identifier identifying the entity requesting the Application Trigger, in this case the host computer 142;

Validity Period: a value indicating a period of time for which the Application Trigger request is valid;

Application Port ID: an identifier identifying an application on the terminal device 150 for which the Application Trigger request is intended;

Trigger Payload: a command to instruct the terminal device 150 to perform an Ethernet configuration action.

As indicated above, the Trigger Payload parameter is a command to instruct the terminal device 150 to perform an Ethernet configuration action. In this case the Trigger Payload parameter may be one of the following four commands:

SET_MAC-ADDRESS(MAC-ADDRESS): This command instructs the terminal device to adopt the value MAC-ADDRESS as its MAC address.

GET_MAC-ADDRESS(INTERFACE_NUMBER): This command instructs the terminal device 150 to report its MAC address for the interface specified by the INTERFACE_NUMBER parameter to the host computer 142.

SET_VLAN ON(INTERFACE(1 . . . N, VLAN_val): This command assigns the terminal device 150 to interfaces 1 . . . N with the value VLAN_val.

SET_ETHERNET_QOS ON(INTERFACE(1 . . . N), e_qos): This command instructs the terminal device 150 to set Ethernet QoS parameters e_qos for interfaces 1 . . . N.

Once the Application Trigger request message has been generated, the host computer 142 transmits the Application Trigger request message to the telecommunications network 110, at step 320.

At step 330, the telecommunications network 110 receives the transmitted Application Trigger request message and, at step 340, checks the authenticity of the Application Trigger request message and the authorization of the host computer 142 to transmit the Application Trigger request message. In this step the NEF 128 checks, based on the Requester Identifier parameter of the Application Trigger request message, whether the host computer 142 is authorized to transmit the Application Trigger message. The NEF 128 also checks whether the host computer 142 has exceeded a predetermined quota of Application Trigger messages that it is permitted to transmit, or a predetermined rate at which it is permitted to transmit Application Trigger messages.

At step 350 (provided that the authenticity and authorization checks are passed), the telecommunications network 110 transmits the Application Trigger message to the terminal device 150. In this step, the NEF 128 invokes a Get Subscriber Serving NF service provided by the UDM 126, in order to determine which Network Function (NF) is serving the terminal device 150, and to obtain a Subscription Permanent Identifier (SUPI) of the terminal device 150.

Once the serving NF and SUPI have been determined, the NEF 128 sends the Application Trigger request, now containing the SUPI and a NAS container including the Application Port ID and the Trigger Payload to the AMF 124.

The AMF 124 receives the Application Trigger request including the Application Port ID and the Trigger Payload originating from the NEF 128 and transmits it to the terminal device 150 (as identified by the SUPI). The Application Trigger request may be transmitted to the terminal device 150 as or in an SMS message (which may be transmitted via the access network 130, for example by a base station 132 of the access network 130). Alternatively, some other convenient transmission format may be employed.

At step 360 the terminal device 150 receives the SMS message containing the Application Trigger request.

At step 370 the application of the terminal device 150 to which the Application Trigger request is directed attempts to perform an appropriate action in response to the command encapsulated in the Trigger Payload parameter of the Application Trigger request.

At step 380 the application of the terminal device 150 generates a response message indicating the response of the terminal device 150 to the command encapsulated in the Trigger Payload parameter of the Application Trigger request, and the terminal device transmits the generated response message to the telecommunications network 110.

For example, if the command is the SET_MAC-ADDRESS(MAC-ADDRESS) command, the application of the terminal device 150 attempts to set the value MAC-ADDRESS as the MAC address of the terminal device 150, and generates an appropriate response message, which is transmitted by the terminal device 150 to the telecommunications network 110. Thus, if the application successfully sets the value MAC-ADDRESS as the MAC address of the terminal device 150, the application generates a Trigger Response message containing a Trigger Response Payload parameter having the value OK for transmission by the terminal device 150 to the telecommunications network 110. In contrast, if the application is unable to set the value MAC-ADDRESS as the MAC address of the terminal device, it generates a Trigger Response message containing a Trigger Response Payload parameter having the value NOT_OK for transmission by the terminal device 150 to the telecommunications network 110.

If the command is the GET_MAC-ADDRESS(INTERFACE_NUMBER) command, the application generates a Trigger Response message containing a Trigger Response Payload parameter having the value MAC-ADDRESS, which is transmitted by the terminal device 150 to the telecommunications network 110, where MAC-ADDRESS is the MAC address of the terminal device 150.

If the command is the SET_VLAN ON(INTERFACE (1 . . . N), VLAN_val)) command, the application attempts to assign the terminal device 150 to a VLAN having the value VLAN_val on interfaces 1 . . . N, and generates an appropriate response message, which is transmitted by the terminal device 150 to the telecommunications network 110. Thus, if the terminal device 150 is successfully assigned to the VLAN having the value VLAN_val on interfaces 1 . . . N, the application generates a Trigger Response message containing a Trigger Response Payload parameter having the value OK for transmission by the terminal device 150 to the telecommunications network 110. In contrast, if the application is unable to assign the terminal device 150 to specified interfaces, the application generates a Trigger Response message containing a Trigger Response Payload parameter having the value NOT_OK for transmission by the terminal device 150 to the telecommunications network 110.

If the command is the SET_ETHERNET_QOS ON(INTERFACE(1 . . . N), e_qos), the application attempts to set an Ethernet QoS parameter e_qos on for interfaces 1 . . . N of the terminal device, and generates an appropriate response message, which is transmitted by the terminal device 150 to the telecommunications network 110. Thus, if the terminal device 150 successfully sets the specified Ethernet QoS parameter for the specified interfaces, the application generates a Trigger Response message containing a Trigger Response Payload parameter having the value OK for transmission by the terminal device 150 to the telecommunications network 110. In contrast, if the application is unable to set the specified Ethernet QoS parameter for the specified interfaces of the terminal device, the application generates a Trigger Response message containing a Trigger Response Payload parameter having the value NOT_OK for transmission by the terminal device 150 to the telecommunications network 110.

At step 390 the telecommunications network 110 transmits the received Trigger Response message to the host computer 142. Specifically, the AMF 124 receives the Trigger Response message and sends it to the NEF 128, which in turn transmits the Trigger Response message to the host computer 142.

In the event that the Trigger Response Payload parameter of the Trigger Response message has the value NOT_OK, the host computer 142 may attempt to re-send the relevant Trigger Request message, and the method may re-start from step 320.

As will be apparent from the discussion above, in the method 300, the NEF 128, UDM 126 and the AMF 124 perform all of the signalling and message transmission/reception required to configure the Ethernet protocol layer functionality of the terminal device 150. The UPF 122 does not perform any of the signalling or message transmission/reception involved in configuring the Ethernet protocol layer functionality of the terminal device 150. However, once the Ethernet protocol layer functionality of the terminal device 150 has been configured using the method of FIG. 3, the UPF 122 is used for direct transfer of Ethernet protocol data between the terminal device 150, telecommunications network 110 and host computer 142.

Figure 3:
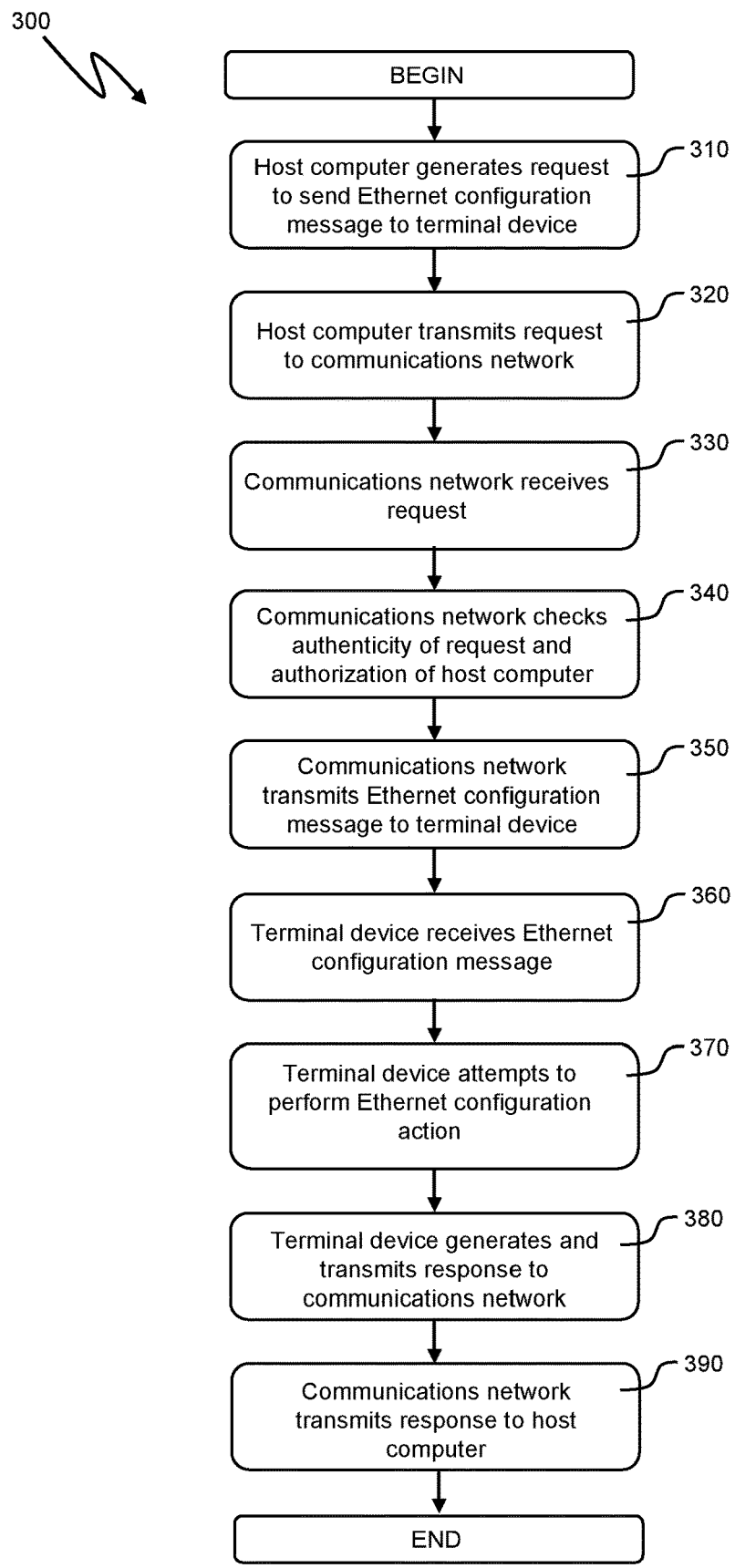
FIG. 3 is a flow diagram showing steps in a method performed by a communication system including a host computer, a telecommunications network and a terminal device for remotely configuring Ethernet layer functionality of the terminal device.
Figure 4:
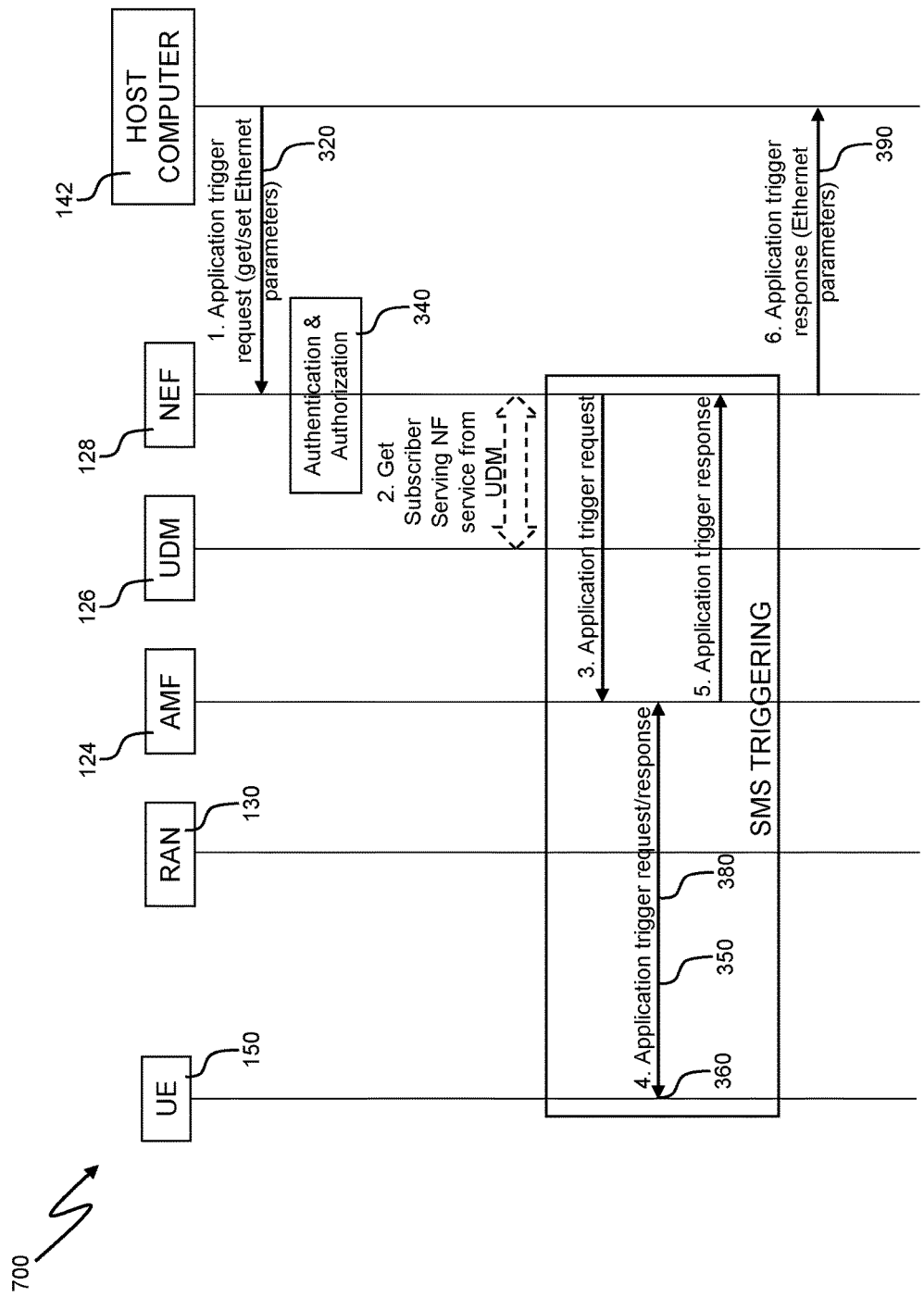
FIG. 4 is a signalling diagram showing signalling between a host computer, a telecommunications network and a terminal device when the method of FIG. 3 is performed.
Figure 5:
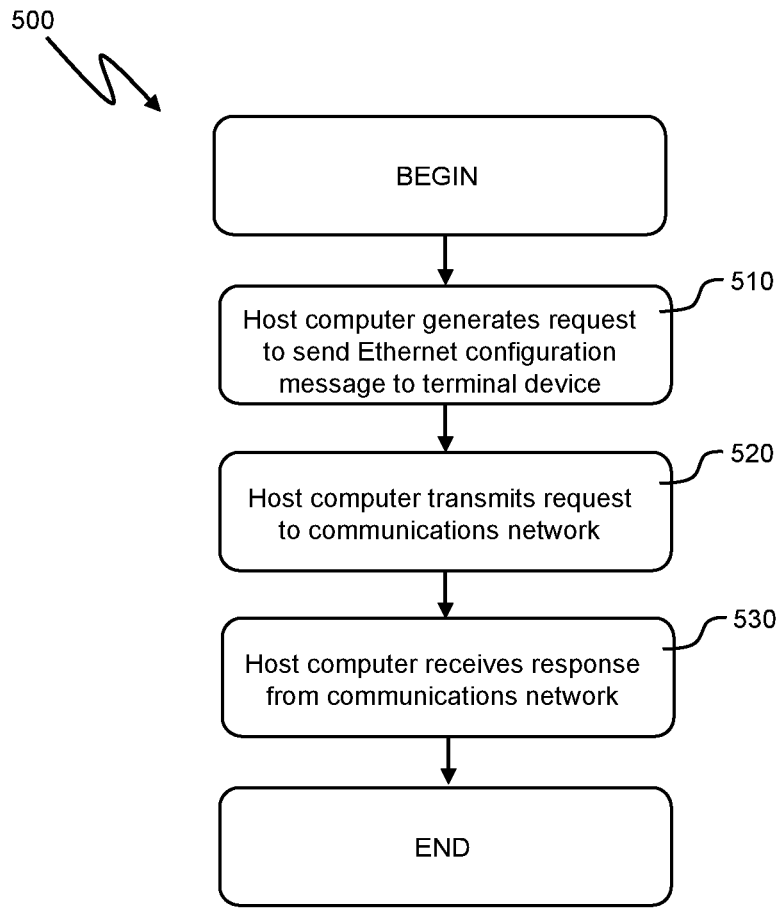
FIG. 5 is a flow diagram showing steps in a method performed by a host computer.

FIG. 5 is a flow chart illustrating steps in a method 500 performed by the host computer 142 during the process of performing the method of FIG. 3.

At step 510, the Ethernet configuration application, module or tool 144 of the host computer 142 generates a request to send an Ethernet configuration message to the terminal device 150, as described above with reference to step 310 of the method of FIG. 3.

At step 520, the host computer 142 transmits the generated request to the telecommunications network 110, as described above with reference to step 320 of the method of FIG. 3.

At step 530, the host computer receives, from the telecommunications network 110, a response message generated by the terminal device 150 in response to the transmitted request, as described above with reference to step 380 of the method of FIG. 3.

Figure 6:
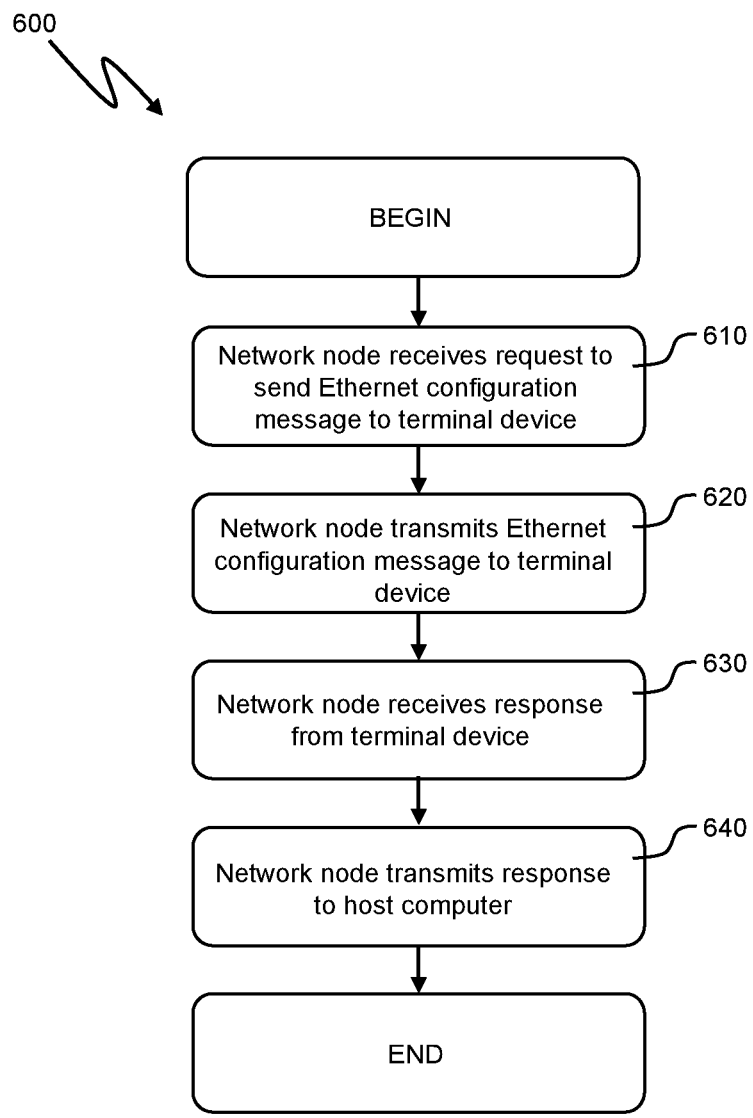
FIG. 6 is a flow diagram showing steps in a method performed by a network node.

FIG. 6 is a flow chart illustrating steps in a method 600 performed by a network node such as a base station 132 of an access network 130 during the process of performing the method of FIG. 3.

At step 610 the network node receives a request to send an Ethernet configuration message to the terminal device 150. As described above the request takes the form of an Application Trigger request message including Application Port ID and Trigger Payload parameters.

At step 620, the network node transmits the Ethernet configuration message to the terminal device 150 in an SMS message or in some other convenient manner as described above with reference to step 350 of the method of FIG. 3.

At step 630, the network node receives a response message generated by the terminal device 150 in response to the transmitted request, as described above with reference to step 380 of the method of FIG. 3.

At step 640, the network node transmits the response message to the host computer 142. The network node may transmit the response message directly to the host computer 142, or may transmit the response message to the host computer 142 via an intermediate network node such as a network node of the core network 120.

Figure 7:
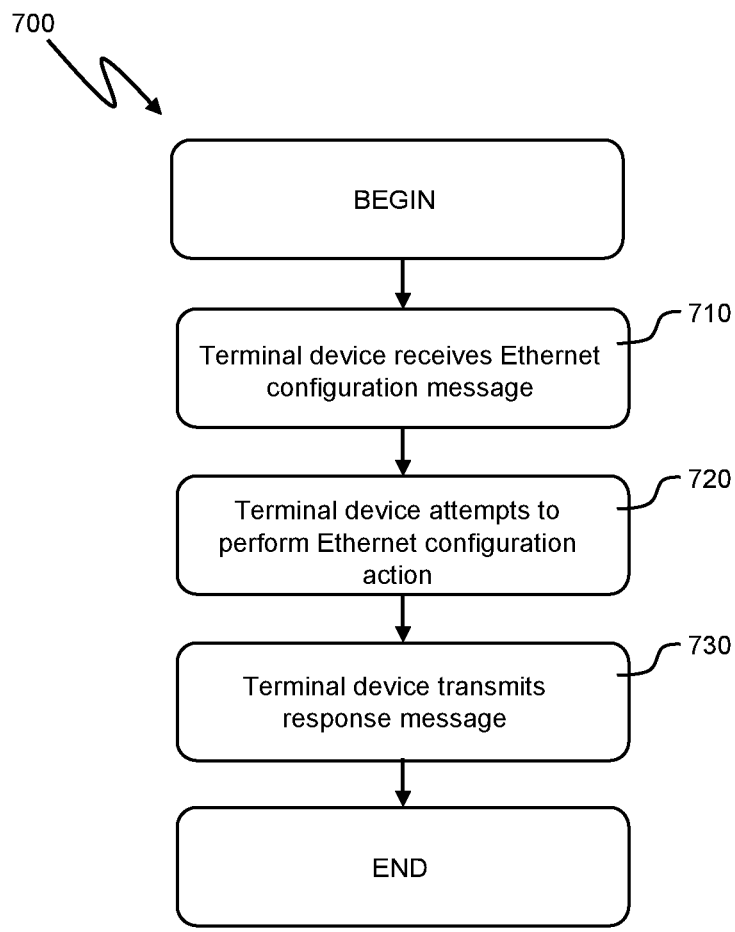
FIG. 7 is a flow diagram showing steps in a method performed by a terminal device.

FIG. 7 is a flow chart illustrating steps in a method 700 performed by the terminal device 150 during the process of performing the method of FIG. 3.

At step 710 the terminal device 150 receives an Ethernet configuration message from the telecommunications network 110 as described above with reference to step 360 of the method of FIG. 3.

At step 720 the terminal device 150 attempts to perform an Ethernet configuration action in response to the received Ethernet configuration message, as described above with reference to step 370 of the method of FIG. 3.

At step 730 the terminal device generates and transmits a response message to the telecommunications network 110 in response to the received Ethernet configuration message, as described above with reference to step 380 of the method of FIG. 3.

As will be apparent from the foregoing description, the methods and apparatus disclosed herein provide a mechanism for remotely configuring Ethernet layer functionality of a terminal device connected to a telecommunications network prior to the establishment of user plane connectivity between the terminal device and the telecommunications network or a host computer connected to the telecommunications network. Thus, the terminal device can be configured quickly and easily for Ethernet protocol data exchange with a remote computing network using only straightforward out of band signalling techniques, without requiring any user plane connectivity between the terminal device and the telecommunications network for Ethernet protocol configuration purposes.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A network node comprising:
   a communications interface for communicating with a cellular communications network which implements a User Plane Function (UPF) and a Network Exposure Function (NEF);
   a radio interface for wirelessly communicating with a terminal device; and
   one or more processors and a memory containing code which, when executed by the one or more processors, cause the network node to:
      receive, from the NEF of the cellular communications network, a request to send an Ethernet configuration message to a terminal device connected to the cellular communications network;
      transmit the Ethernet configuration message to the terminal device using the radio interface, without using the UPF of the cellular communications network; and
      receive a response message from the terminal device at the radio interface.

2. The network node according to claim 1, wherein the request includes an identifier and a payload, wherein the identifier identifies a receiving application on the terminal device, and wherein the payload comprises information intended for the receiving application identified by the identifier.

3. The network node according to claim 1, wherein the network node is configured to transmit the Ethernet configuration message to the terminal device in a short messaging service (SMS) message.

4. The network node according to claim 2, wherein the payload comprises information for setting a medium access control (MAC) address of the terminal device.

5. The network node according to claim 2, wherein the payload comprises configuration information for a virtual local area network (VLAN).

6. The network node according to claim 2, wherein the payload comprises information for setting Ethernet quality of service parameters at the terminal device.

7. A terminal device configured to communicate with a cellular communications network which implements a User Plane Function (UPF) and a Network Exposure Function (NEF) to receive an Ethernet configuration message originating from the NEF of the cellular communications network, the terminal device comprising:
   a radio interface;
   one or more processors; and
   memory storing executable Ethernet configuration application code which, when executed by the one or more processors, causes the terminal device, in response to receiving the Ethernet configuration message from the cellular communications network at the radio interface, to perform an Ethernet configuration action and to transmit a response message to the cellular communications network using the radio interface without using the UPF of the cellular communications network.

8. The terminal device according to claim 7, wherein the executable code, when executed by the one or more processors, causes the terminal device, in response to receiving an Ethernet configuration message comprising information for setting a medium access control (MAC) address of the terminal device, to attempt to set its MAC address in accordance with the information and to transmit a response message to the cellular communications network indicating acceptance or rejection of the MAC address by the terminal device.

9. The terminal device according to claim 7, wherein the executable code, when executed by the one or more processors, causes the terminal device, in response to receiving an Ethernet configuration message comprising information for querying a medium access control (MAC) address of the terminal device, to retrieve its MAC address and to transmit a response message indicating the retrieved MAC address to the cellular communications network.

10. The terminal device according to claim 7, wherein the executable code, when executed by the one or more processors, causes the terminal device, in response to receiving an Ethernet configuration message comprising configuration information for a virtual local area network (VLAN), to attempt to configure a VLAN in accordance with the information and to transmit a response message to the cellular communications network indicating acceptance or rejection of the configuration of the VLAN.

11. The terminal device according to claim 7, wherein the executable code, when executed by the one or more processors, causes the terminal device, in response to receiving an Ethernet configuration message comprising information for setting Ethernet quality of service parameters at the terminal device, attempts to configure Ethernet quality of service parameters in accordance with the information and to transmit a response message to the cellular communications network indicating acceptance or rejection of the Ethernet quality of service parameters.

12. A host computer configured to communicate with a cellular communications network which implements a User Plane Function (UPF) and a Network Exposure Function (NEF), the host computer comprising:
 a communications interface;
 one or more processors; and
 memory storing executable Ethernet configuration application code which, when executed by the one or more processors, causes the host computer to generate an application trigger request to send an Ethernet configuration message to a terminal device connected wirelessly to the cellular communications network and to transmit the generated request to the NEF of the cellular communications network.

13. The host computer according to claim 12, wherein the application trigger request includes an identifier and a payload, wherein the identifier identifies a receiving application on the terminal device, and wherein the payload comprises information intended for the receiving application identified by the identifier.

14. The host computer according to claim 13, wherein the payload comprises configuration information for a virtual local area network (VLAN).

15. The host computer according to claim 13, wherein the payload comprises information for setting Ethernet quality of service parameters at the terminal device.

16. The host computer according to claim 12, wherein the application trigger request is the Ethernet configuration message.

17. A system, including a host computer, a cellular communications network which implements a User Plane Function (UPF) and a Network Exposure Function (NEF) and a terminal device, for remotely configuring Ethernet layer protocol functionality of the terminal device, wherein:
 the host computer is configured to generate a request to send an Ethernet configuration message to the terminal device and to transmit the generated request to the NEF of the cellular communications network;
 the cellular communications network is configured to receive the request to transmit the Ethernet configuration message to the terminal device without using the UPF of the cellular communications network; and
 the terminal device is configured to receive the Ethernet configuration message from the cellular communications network via a wireless connection between the terminal device and the cellular communications network, and, in response to receiving the Ethernet configuration message, to perform an Ethernet configuration action and to transmit a response message to the cellular communications network via the wireless connection.

18. The system according to claim 17, wherein the request includes an identifier and a payload, wherein the identifier identifies a receiving application on the terminal device, and wherein the payload comprises information intended for the receiving application identified by the identifier.

19. The system according to claim 17, wherein the host computer is a controller of a cloud computing platform, wherein the host computer is configured to execute Ethernet configuration application code which generates the request.

* * * * *